(12) United States Patent
Milburn

(10) Patent No.: US 6,264,091 B1
(45) Date of Patent: Jul. 24, 2001

(54) METHOD OF MANUFACTURING AN ARTICLE BY DIFFUSION BONDING

(75) Inventor: Richard G Milburn, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/158,890

(22) Filed: Sep. 23, 1998

(30) Foreign Application Priority Data

Oct. 9, 1997 (GB) ................................................ 9721338

(51) Int. Cl.$^7$ ........................... B21D 39/00; B23K 31/02; B23K 20/00; B23K 28/00
(52) U.S. Cl. ........................... 228/157; 228/118; 228/190; 228/193
(58) Field of Search ........................... 228/193, 157, 228/190, 118

(56) References Cited

U.S. PATENT DOCUMENTS

| | | | |
|---|---|---|---|
| 4,304,821 | 12/1981 | Hayase . | |
| 5,263,638 | * 11/1993 | Douglas | 228/118 |
| 5,284,288 | * 2/1994 | Woodward | 228/157 |
| 5,323,536 | * 6/1994 | Fowler et al. | 29/889.72 |
| 5,484,977 | * 1/1996 | Douglas | 219/121.13 |
| 5,611,944 | * 3/1997 | Gilkinson et al. | 219/117.1 |
| 5,752,725 | * 5/1998 | El-Sobky | 285/21.1 |

FOREIGN PATENT DOCUMENTS 2269556   2/1994   (GB) .

* cited by examiner

*Primary Examiner*—Patrick Ryan
*Assistant Examiner*—Zidia Pittman
(74) *Attorney, Agent, or Firm*—W. Warren Taltavull; Manelli, Denison & Selter PLLC

(57) ABSTRACT

A method of diffusion bonding at least two metal workpieces (12, 14, 16) comprises assembling the workpieces (12, 14, 16) into a stack (10) relative to each other so that the surfaces (18, 20, 22, 24) are in mating contact. The edges of the workpieces (12, 14, 16) are sealed together, except for an aperture (42) where a pipe (44) is to be inserted. A pipe (44) is joined to the stack (10) such that the axis (50) of the pipe (44) is arranged at an angle of at least 45° to the axis (48) of the aperture (42) to provide a sealed assembly. The interior of the sealed assembly is evacuated via the pipe (44) and the pipe (44) is sealed. Sufficient heat and pressure is applied across the thickness of the workpieces (10, 12, 14) to diffusion bond the workpieces together to form an integral structure. The angling of the pipe (44) relative to the aperture (42) reduces the possibility of the pipe (44) being sucked back and bursting during diffusion bonding.

13 Claims, 3 Drawing Sheets

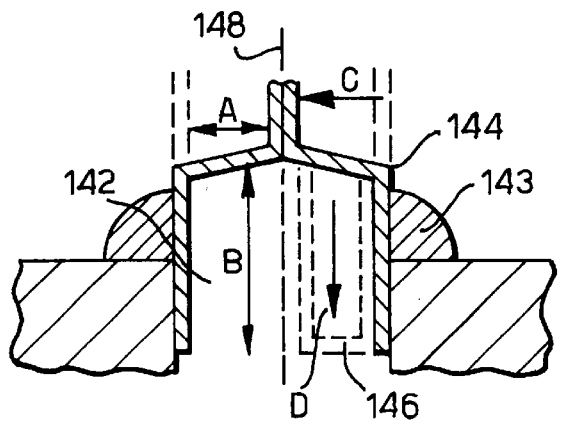
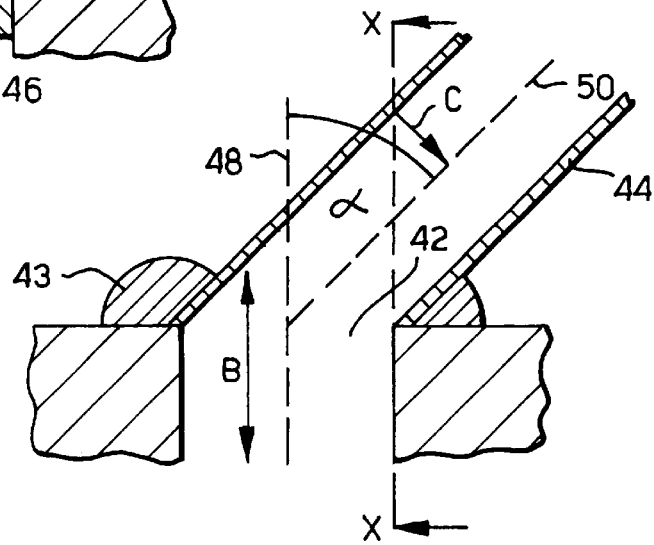
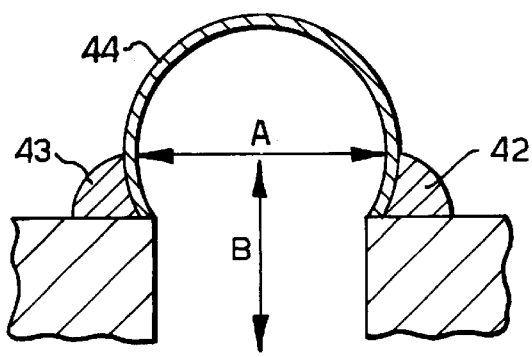
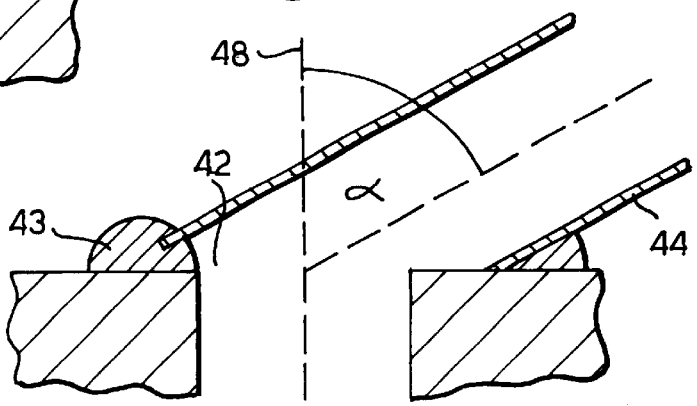

METHOD OF MANUFACTURING AN ARTICLE BY DIFFUSION BONDING

FIELD OF THE INVENTION

The present invention relates to a method of manufacturing an article by diffusion bonding, and particularly relates to a method of manufacturing an article by superplastic forming and diffusion bonding.

BACKGROUND OF THE INVENTION

It is known to manufacture hollow metallic articles by superplastic forming and diffusion bonding metal workpieces. These metal workpieces include elementary metal, metal alloys, intermetallic materials and metal matrix composites. At least one of metal workpieces must be capable of superplastic extensions.

In one known process of diffusion bonding the surfaces of the workpieces to be joined are cleaned. The workpieces are arranged in a stack and the edges of the workpieces are welded together, except for an aperture where a pipe is welded to the workpieces, to form a sealed assembly. The interior of the sealed assembly is evacuated and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface such that the interface effectively ceases to exist.

In one known process of superplastic forming and diffusion bonding the surfaces of the workpieces to be jointed are cleaned, and at least one surface of one or more of the workpieces is coated in preselected areas with a material to prevent diffusion bonding. The workpieces are arranged in a stack and the edges of the workpieces are welded together, except for an aperture where a pipe is welded to the workpieces, to form a sealed assembly. The pipe enables a vacuum, or inert gas pressure, to be applied to the interior of the sealed assembly. The sealed assembly is placed in an autoclave and heated so as to "bake out" the binder from the material used to prevent diffusion bonding. The sealed assembly is then evacuated and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface. The first pipe is removed and a second pipe is fitted to the diffusion bonded assembly at the aperture where the first pipe was located. The integral structure is located between two appropriately shaped dies and is placed within an autoclave. The integral structure and dies are heated and pressurised fluid is supplied through the second pipe into the interior of the integral structure to cause at least one of the workpieces to be superplastically formed to produce an article, or component, matching the shape of the dies.

In another known process of diffusion bonding the surfaces of the components to be joined are cleaned. The components are arranged in a stack and the stack is placed in a metal bag, the metal bag is sealed except for an aperture where a pipe is welded to the metal bag, to form a sealed assembly. The interior of the sealed assembly is evacuated and the pipe is sealed. The sealed assembly is placed in a pressure vessel and is heated and pressed to diffusion bond the components and metal bag together to form an integral structure. Diffusion bonding occurs when two mating surfaces are pressed together under temperature, time and pressure conditions that allow atom interchange across the interface such that the interface effectively ceases to exist.

In these known methods of diffusion bonding and superplastic forming it is essential that there is a vacuum in the sealed assembly in order to ensure that a satisfactory diffusion bond is formed between the workpieces, or components, and that the vacuum is maintained in the sealed assembly when they are subsequently heated and pressed together during the diffusion bonding process.

The heat and pressure applied during diffusion bonding causes the pipe to collapse, but the end of the pipe joined to the sealed assembly is supported by the joint. It is often necessary to use large internal diameter pipes, particularly for the manufacture of large articles, to provide sufficient gas conductance at reduced pressure for good evacuation of the sealed assembly prior to diffusion bonding. These large internal diameter pipes have thin walls. A problem associated with the diffusion bonding process is that the temperature and pressure applied during the diffusion bonding process is likely to cause the walls of the pipes to be sucked back into the sealed assembly because of the vacuum in the sealed assembly. If the walls of the pipe are sucked back there is a possibility that the pipe will burst and thus the vacuum in the sealed assembly will be lost. This means that diffusion bonding of the workpieces, or components, will not occur.

SUMMARY OF THE INVENTION

The present invention seeks to provide a novel method of manufacturing an article by diffusion bonding which reduces, or overcomes, the above mentioned disadvantages.

Accordingly the present invention provides a method of manufacturing an article by diffusion bonding at least two metal workpieces, or at least two metal components, comprising the steps of:

(a) assembling the at least two metal workpieces, or at least two metal components, into a stack relative to each other so that the surfaces are in mating contact, (b) sealing the edges of the at least two metal workpieces, or at least two metal components, together, except for an aperture where a pipe is to be inserted, joining a pipe to the stack to provide a sealed assembly, joining the pipe to the stack such that the axis of the pipe is arranged at an angle of at least 45° to the axis of the aperture, (c) evacuating the interior of the sealed assembly via the pipe, (d) sealing the pipe with at least one seal, (e) applying sufficient heat and pressure across the thickness of the at least two metal workpieces, or at least two metal components, to diffusion bond the at least two metal workpieces, or at least two metal components, together to form an integral structure.

The sealing of the edges of the at least two metal workpieces, or at least two metal components, may be by welding the edges of the at least two metal workpieces, or at least two metal components, together. Alternatively the sealing of the edges of the at least two metal workpieces, or at least two metal components, may be by placing the at least two metal workpieces, or at least two metal components, in a metal bag.

Preferably the pipe is joined to the stack such that the axis of the pipe is arranged at an angle of at least 60° to the axis of the aperture, more preferably the pipe is joined to the stack such that the axis of the pipe is arranged at an angle of 90° to the axis of the aperture.

If the pipe has a diameter less than the aperture, the method comprises sealing the aperture to the outer periphery of a ring and sealing the pipe to the inner periphery of a ring.

Preferably the method comprises before the metal workpieces are stacked together, applying a stop off material to preselected areas of at least one of the surfaces of at least one of the at least two metal workpieces to prevent diffusion bonding at the preselected areas, before the pipe is sealed placing the sealed assembly in an oven, heating the sealed assembly while it is within the oven to evaporate volatile binder from the stop off material and continuously evacuating the sealed assembly to remove volatile binder from between the at least two metal workpieces of the sealed assembly, after the integral structure is formed heating the integral structure and internally pressurising the integral structure to cause some of the preselected areas of at least one of the metal workpieces to be superplastically formed to produce an article of predetermined shape.

The article may be a fan blade, a compressor blade, a fan duct outlet guide vane or a heat exchanger component.

Preferably each metal component is manufactured by applying stop off material to preselected areas of at least one of the surfaces of at least one of at least two metal workpieces to prevent diffusion bonding at the preselected areas, assembling the at least two metal workpieces into a stack relative to each other so that the surfaces are in mating contact, sealing the edges of the at least two metal workpieces together, except for an aperture where a pipe is to be inserted, joining a pipe to the stack to provide a sealed assembly, placing the sealed assembly in an oven, heating the sealed assembly while it is within the oven to evaporate volatile binder from the stop off material and continuously evacuating the sealed assembly to remove volatile binder from between the at least two metal workpieces of the sealed assembly, sealing the pipe with at least one seal, applying sufficient heat and pressure across the thickness of the at least two metal workpieces to diffusion bond the at least two metal workpieces together to form an integral structure, heating and internally pressurising the integral structure to cause some of the preselected areas of at least one of the metal workpieces to be superplastically formed to produce a metal component of predetermined shape.

The joining of the pipe to the stack of metal workpieces may be such that the axis of the pipe is arranged at an angle of at least 45° to the axis of the aperture.

The metal components may be heat exchanger components and the article is a heat exchanger.

BRIEF DESCRIPTION OF THE DRAWINGS

The present invention will be more fully described by way of example with reference to the accompanying drawings, in which:

FIG. 3 illustrates an enlarged sectional view through a prior art attachment of a pipe to the stack of workpieces.

FIG. 4 illustrates an enlarged sectional view through an attachment of a pipe to the stack of workpieces as shown in FIG. 2.

FIG. 5 is a sectional view in the direction of arrows X—X in FIG. 4.

FIG. 6 illustrates an alternative enlarged sectional view through an attachment of a pipe to the stack of workpieces as shown in FIG. 2.

DETAILED DESCRIPTION OF THE INVENTION

Figure 1:
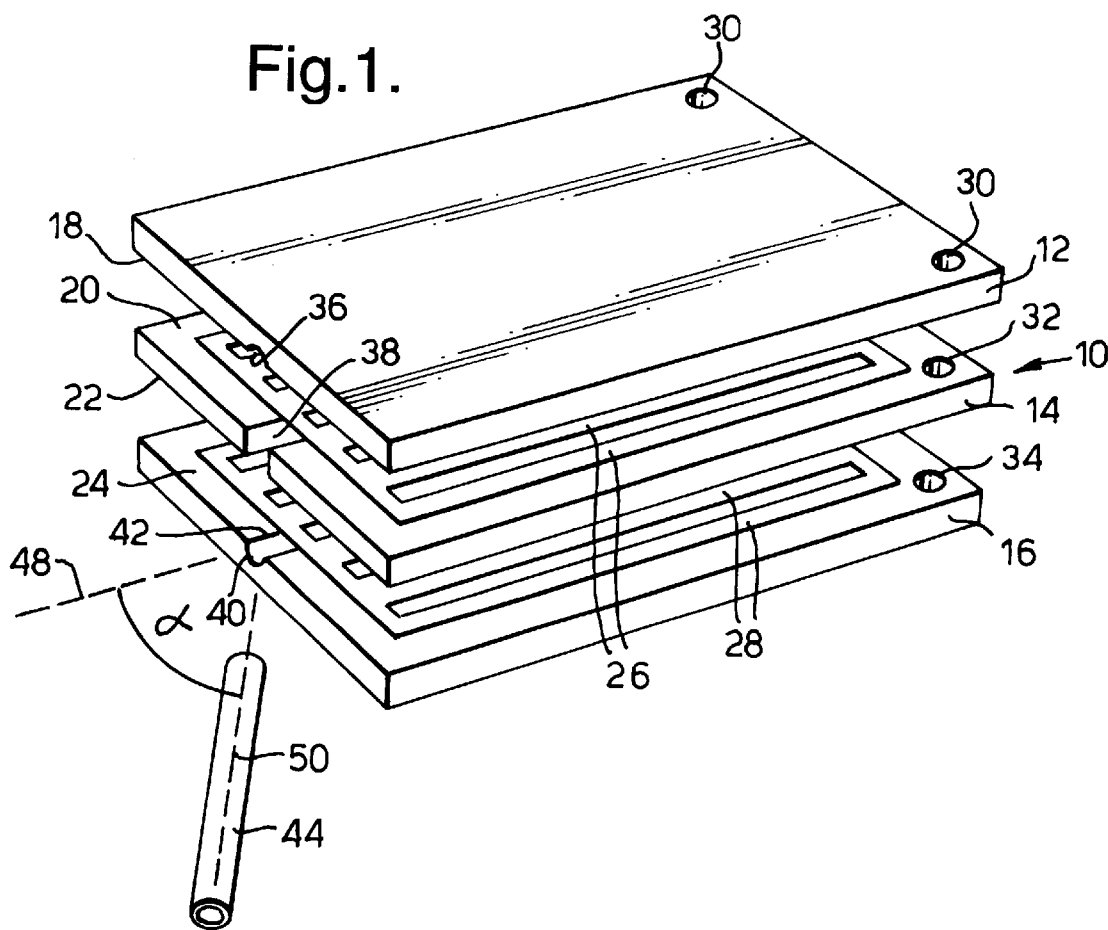
FIG. 1 illustrates an exploded view of a stack of workpieces which are to be superplastically formed and diffusion bonded to form an article according to the present invention.

Three workpieces of titanium alloy 12, 14 and 16 are assembled into a stack 10 as shown in FIG. 1. Prior to assembling the workpieces 12, 14 and 16 into the stack 10, the mating surfaces 18, 20, 22 and 24 of the workpieces 12, 14 and 16 are prepared for diffusion bonding by chemical cleaning. One of the mating surfaces 18 and 20, in this example mating surface 20, has had a stop off material applied, and one of the mating surfaces 22 and 24, in this example mating surface 24, has had a stop off material applied. The stop off material may comprise powdered yttria in a binder and solvent e.g. the stop off known as "Stopyt 62A" which is sold by an American company named GTE Services Corporation of 100 Endicott Street, Danvers, Mass. 01923 USA.

The stop off material is applied in desired patterns 26 and 28, shown as the shaded areas in FIG. 1, by the known silk screen printing process. The desired patterns 26 and 28 of stop off material prevent diffusion bonding between preselected areas of the workpieces 12, 14 and 16. In this example the stop off is applied in straight lines, but it may be applied as dots or other suitable patterns depending on the particular article, or component, to be manufactured. The three workpieces of titanium alloy 12, 14 and 16 are then assembled into the stack 10. The workpiece 12 has a pair of dowel holes 30 which are axially aligned with corresponding dowel holes 32 in workpiece 14 and with corresponding dowel holes 34 in workpiece 16 to ensure the correct positional relationship between the three workpieces 12, 14 and 16 in the stack 10. The workpieces 12, 14 and 16 are maintained in this positional relationship by a pair of dowels (not shown) which are inserted in the axially aligned dowel holes 30, 32 and 34.

Figure 2:
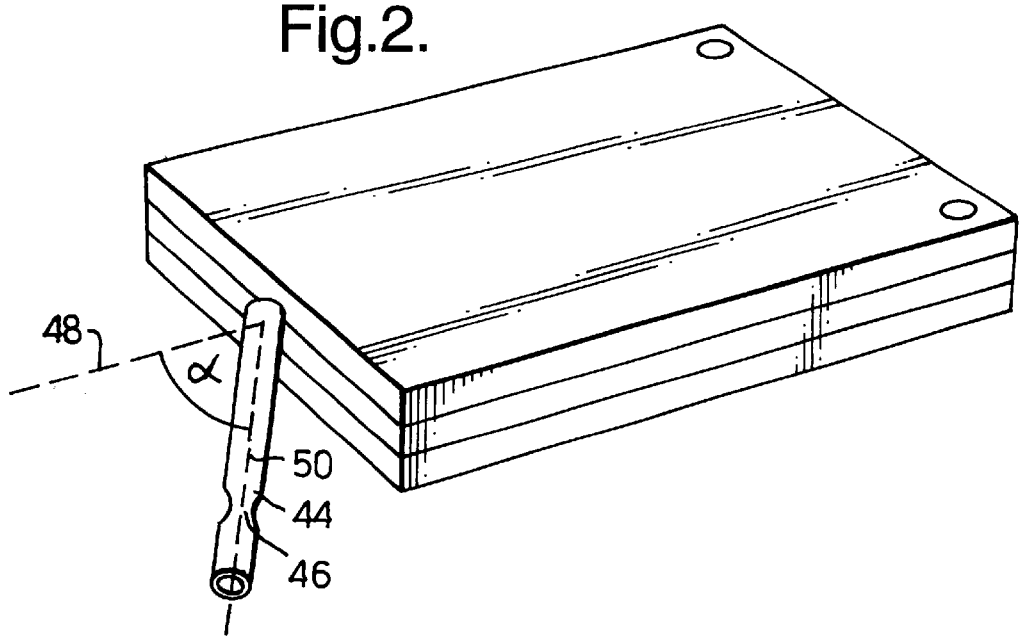
FIG. 2 illustrates a view of the stack of workpieces shown in FIG. 1 after welding together and before diffusion bonding and an attachment of the pipe to the stack according to the present invention.

The workpieces 12, 14 and 16 of the stack 10 are placed together to form an aperture 42. In this example a groove 36 is machined on surface 18 of workpiece 12, a slot 38 is machined through workpiece 14 and a groove 40 is machined on surface 24 of workpiece 16. The slot 38 in workpiece 14 extends between the surfaces 20 and 22 to interconnect the pattern of stop off material between the workpieces 14 and 16. The aperture 42 interconnects with the pattern of stop off material between the workpieces 12 and 14 and also with the pattern of stop off material between the workpieces 14 and 16. On completion of the assembly in the manner described it is welded about its periphery, so as to weld the edges of workpieces 12 and 14 together and to weld the edges of workpieces 14 and 16 together. One end of a pipe 44 is welded around its periphery to the workpieces 12, 14 and 16 over the end of the aperture 42. A sealed assembly is formed except for the inlet provided by the pipe 44 as shown in FIG. 2.

It is of course possible to machine grooves on the mating surfaces of one pair of workpieces to form an aperture and to weld the end of the pipe to the aperture and to provide apertures, or slots, through one of the workpieces to interconnect with the stop off patterns between all the workpieces. As a further alternative it is possible to machine grooves on each set of mating surfaces to form a plurality of apertures and to weld the end of a corresponding pipe to each aperture. In the last possibilities it is possible to machine the grooves in one, or both, of the mating surfaces of the workpieces.

The aperture 42 has an axis 48 and the pipe 44 has an axis 50, the pipe 44 is arranged such that the axis of the pipe 50 makes an angle of at least 45° with respect to the axis of the aperture 42. The pipe 44 is arranged at an angle of 45° in FIGS. 2 and 4.

The pipe 44 is then connected to a vacuum pump which is used to evacuate the interior of the sealed assembly and then inert gas, for example argon, is supplied to the interior of the sealed assembly. This process of evacuating and supplying inert gas to the interior of the sealed assembly may be repeated several times in order to ensure that most, or substantially all, traces of oxygen are removed from the interior of the sealed assembly. The particular number of times that the interior of the sealed assembly is evacuated and purged with inert gas depends upon the size of the workpieces and upon the required integrity of the finished component, or article. The smaller the traces of oxygen remaining, the greater the quality of the subsequent diffusion bond. The inert gas is supplied to pressurise the interior of the sealed assembly to atmospheric pressure.

The sealed assembly is evacuated and is placed into an oven. The sealed assembly is then heated to a temperature of at least 250° C. to evaporate the binder from the stop off material. During the baking out of the binder, the sealed assembly is continuously evacuated to remove the binder from between the workpieces. After the binder has been removed, which is determined either by monitoring the binder levels in the gas extracted from the sealed assembly or by maintaining the sealed assembly at the predetermined temperature of at least 250° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surface of the sealed assembly. The actual bake out temperature depends upon the stop off composition.

The pipe 44 is then sealed at at least one location 46, as shown in FIG. 2, so that there is a vacuum in the sealed assembly. The pipe 44 is sealed at the location 46 by any suitable method, for example resistance welding e.g. spot welding or seam welding. The sealed assembly is then transferred carefully to a an autoclave because the stop off material is brittle and easily damaged. Alternatively a predetermined amount of binder may be left in the stop off material, so that the stop off material is not too brittle, to enable the sealed assembly to be transferred more easily to the autoclave without damage to the stop off material.

The temperature in the autoclave is increased such that the sealed assembly is heated to a temperature greater than 850° C. and the argon pressure in the autoclave is raised to greater than 20 atmospheres, 294 pounds per square inch (20.26× $10^5 Nm^{-2}$) and held at that temperature and pressure for a predetermined time. Preferably the sealed assembly is heated to a temperature between 900° C. and 950° C. and the pressure is between 294 pounds per square inch (20.26× $10^5 Nm^{-2}$) and 441 pounds per square inch (30.39× $10^5 Nm^{-2}$). For example if the the sealed assembly is heated to 925° C. and the pressure is raised to 300 pounds per square inch the temperature and pressure are maintained constant for about 2 hours. The pressure is then reduced to ambient, diffusion bonding having been achieved and the sealed assembly, which is then an integral structure, is removed.

In the prior art the axis of pipe 144 is arranged coaxially with the axis 148 of the aperture 142, as shown in FIG. 3. The heat and pressure applied during diffusion bonding causes the pipe 144 to collapse in direction C, but the end of the pipe 144 joined to the sealed assembly is supported by the weld joint 143. The collapsed portion of the pipe 144 is directly over the aperture 142. If the pipe 144 is a large internal diameter pipe to provide sufficient gas conductance at reduced pressure for good evacuation of the sealed assembly prior to diffusion bonding, the large internal diameter pipe 144 has relatively thin walls compared to the diameter of the pipe. The inner diameter of the pipe 144 is greater than twice the thickness of the walls. The diffusion bonding process causes the walls of the pipe 144 to be sucked back in direction D as shown by the dashed lines 146 into the sealed assembly because of the pressure difference across the wall of the pipe 144, because the collapsed portion of the pipe 144 is over the aperture 142 and because the construction of the pipe 144 is more susceptible to being sucked back. The pressure difference is due to the diffusion bonding pressure outside the pipe 144 and the vacuum pressure in the sealed assembly. If the walls of the pipe are sucked back there is a possibility that the pipe 144 will burst and thus the vacuum in the sealed assembly will be lost. This means that diffusion bonding of the workpieces, or components, will not occur. The material of the pipe 144 over distance A is sucked back a distance B to burst. An A/B ratio of 1 to 1 would require the material over distance A to strain by 200%, and hence result in bursting of the pipe 144.

In the invention as shown in FIGS. 2, 4 and 5 the pipe 44 is arranged such that the angle between the axis 48 of the aperture 42 and the axis 50 of the pipe 44 is at least 45°, in this embodiment 45°. This arrangement increases the distance A so that the A/B ratio is reduced and therefore this reduces the strain in the material in distance A of pipe 44. As a result the possibility of the pipe 44 bursting is at least reduced or prevented. The angling of the pipe 44 minimises the possibility of the collapsed portion of the pipe 44 being formed directly over the aperture 42 and either reduces the suck back distance B or increases the distance A.

FIG. 6 shows an alternative arrangement in which the pipe 44 is arranged such that the angle between the axis 48 of the aperture 42 and the axis 50 of the pipe 44 is 60°. This arrangement also increases the distance A so that the A/B ratio is reduced and therefore this reduces the strain in the material in distance A of pipe 44. As a result the possibility of the pipe 44 bursting is at least reduced or prevented. The angling of the pipe 44 minimises the possibility of the collapsed portion of the pipe 44 being formed directly over the aperture 42 and either reduces the suck back distance B or increases the distance A.

Figure 7:
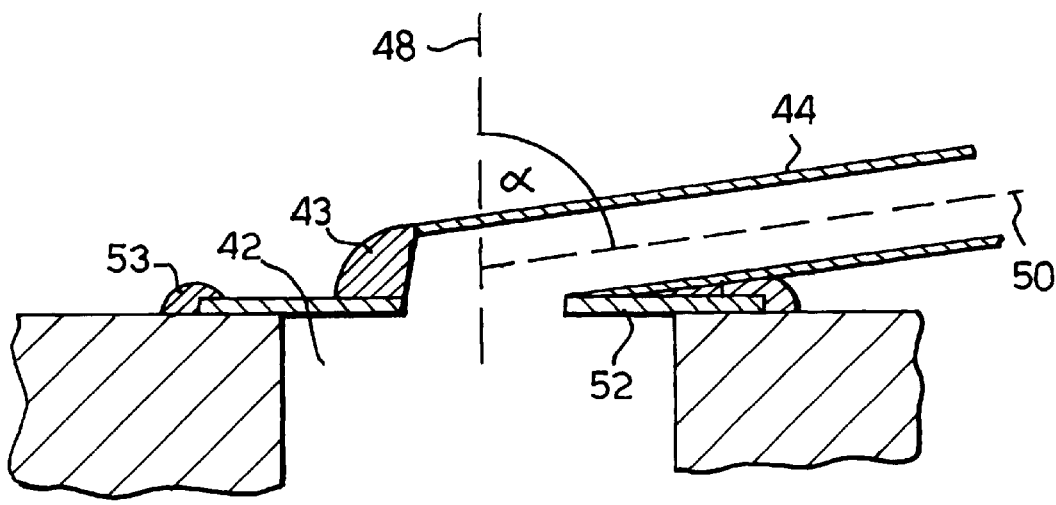
FIG. 7 illustrates an alternative enlarged sectional view through an attachment of a pipe to the stack of workpieces as shown in FIG. 2.

FIG. 7 shows a further alternative arrangement in which the pipe 44 is arranged such that the angle between the axis 48 of the aperture 42 and the axis 50 of the pipe 44 is substantially 90°. This arrangement also increases the distance A so that the A/B ratio is reduced and therefore this reduces the strain in the material in distance A of pipe 44. As a result the possibility of the pipe 44 bursting is at least reduced or prevented. The angling of the pipe 44 minimises the possibility of the collapsed portion of the pipe 44 being formed directly over the aperture 42 and either reduces the suck back distance B or increases the distance A. The aperture 42 in FIG. 7 is much greater than the diameter of the pipe 44, therefore a ring 52 is placed over the aperture 42 and the aperture 42 is sealed to the outer periphery of the ring 52 by a weld 53 and the pipe 44 is sealed to the inner periphery of a ring 52 by the weld 43.

After successful diffusion bonding the pipe 44 is removed and a second pipe is fitted to the integral structure, and argon is introduced into the areas, within the integral structure, containing the stop off material in order to break the adhesive grip which the diffusion bonding pressure has brought about. The argon is carefully introduced to those areas which contain the stop off material, and the argon seeps through the stop off material and eventually reaches the opposing end of the integral structure. The argon may initially be caused to travel between one pair of workpieces and on reaching the opposite end return to the inlet and between another pair of workpieces. In any event, the argon must travel the whole length of the interior of the integral structure such as to break the adhesive grip between the stop off material and the workpieces brought about during the diffusion bonding step.

The integral structure is placed between appropriately shaped split dies positioned within an autoclave. The integral structure is again heated between the dies to a temperature greater than 850° C., preferably between 900° C. and 950° C. In this example, the dies and integral structure are heated to 925° C. Argon is introduced into the interior of the integral structure between the adjacent workpieces, so as to force the outer workpieces 12 and 16 into the respective die half shapes which generates an internal structure depending on the pattern of the stop off material applied.

The magnitude of the movement of at least one of the workpieces during deformation, is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book "The Science, Technology and Applications of Titanium" edited by R. I. Jaffe and N. E. Promisel, published by Pergamon Press in 1970, which is hereby incorporated by reference. The method ensures that the metal is subjected that strain rate which will achieve the maximum permissible speed of extension at any given point in the procedure. The rate of application, and/or volume of the gas pulses may thus vary during the expansion of the workpieces.

On completion of superplastic forming, the inert argon atmosphere within the integral structure is maintained whilst the structure is cooled. This integral structure may be the finished article, some final machining of the integral structure may be required to produce the finished article or several of the integral structures may be diffusion bonded together to produce the finished article.

Although the invention has been described with reference to a method of superplastic forming and diffusion bonding it is equally applicable to a method of diffusion bonding only. In the method of diffusion bonding only it will not be necessary to apply stop off material to the workpieces, or components, nor to evaporate binder and remove binder from the stack of workpieces or components, nor to superplastically form.

Figure 8:
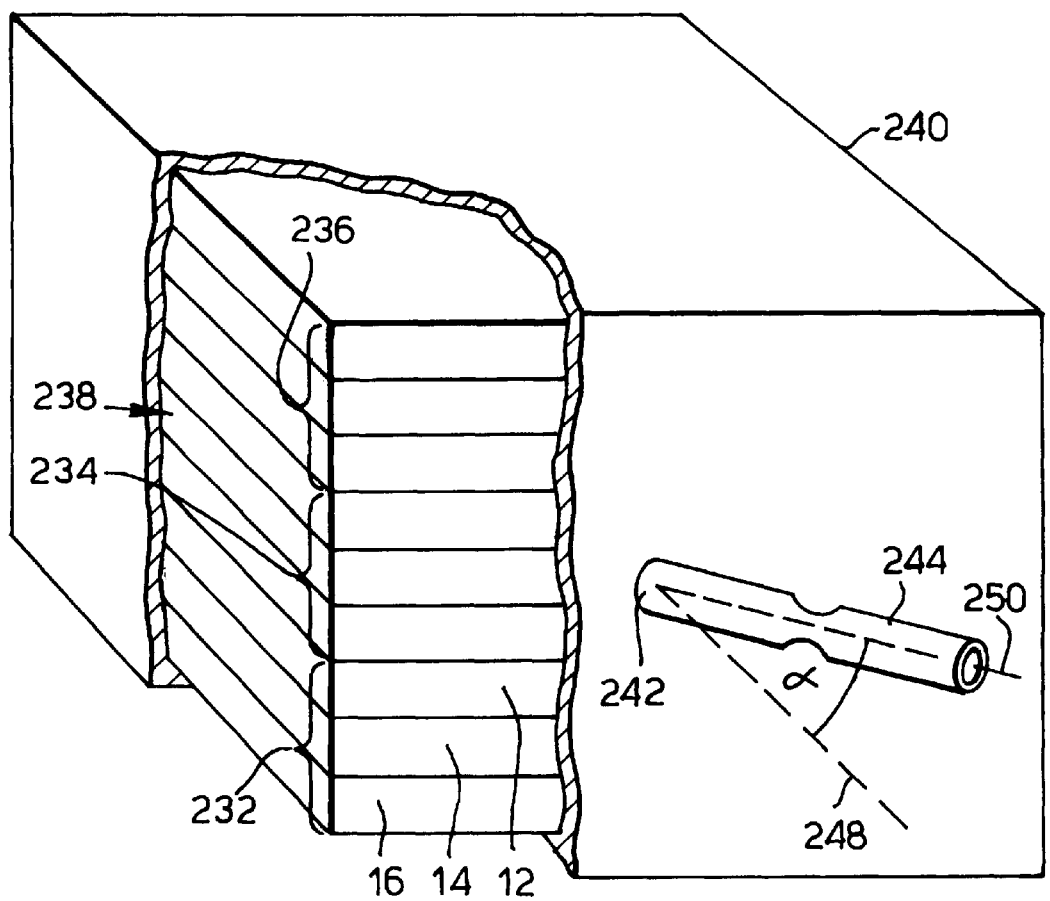
FIG. 8 illustrates a cut away view of stack of components after placing in a metal bag and before diffusion bonding to form form an article.

Three components of titanium alloy 232, 234 and 236 are assembled into a stack 238 as shown in FIG. 8. Prior to assembling the components 232, 234 and 236 into the stack 238, the mating surfaces of the components 232, 234 and 236 are prepared for diffusion bonding by chemical cleaning. Each of the components 232, 234 and 236 may comprise a number of workpieces 12, 14 and 16 which have been superplastically formed and diffusion bonded as described above. The stack 238 is placed in a metal bag 240 and the metal bag 240 is sealed except for an aperture 242 where a pipe 244 is welded to the metal bag 240 to form a sealed assembly. The pipe 244 enables a vacuum, or inert gas pressure, to be applied to the interior of the sealed assembly.

The pipe 244 is arranged such that the angle between the axis 248 of the aperture 242 and the axis 250 of the pipe 244 is at least 45°, in this embodiment 45°. This arrangement decreases the A/B ratio and therefore this reduces the strain in the material of pipe 244. As a result the possibility of the pipe bursting is at least reduced or prevented. The angling of the pipe 244 minimises the possibility of the collapsed portion of the pipe 244 being formed directly over the aperture 242 and either reduces the suck back distance B or increases the distance A.

The sealed assembly is placed in a pressure vessel and is heated and pressed to diffusion bond the components and metal bag together to form an integral structure. Diffusion bonding occurs when two mating surfaces are pressed together under temperature, time and pressure conditions that allow atom interchange across the interface such that the interface effectively ceases to exist.

Although the description has referred to titanium workpieces the present invention is equally applicable to workpieces of other elementary metals, metal alloys, intermetallics and metal matrix composites which are diffusion bondable and one of the workpieces may be capable of superplastic extension. Aluminium and stainless steel are capable of superplastic extension at suitable temperatures and pressures. Although the invention has referred to a stack of three metal workpieces it is possible to have stacks comprising two or more workpieces. It is also possible to stack two or more components together.

The method is suitable for manufacturing heat exchanger components, components for turbomachines, for example fan blades, compressor blades, fan duct outlet guide vanes etc. The method is particularly suitable for making heat exchangers from stacks of heat exchanger components.

The invention has been described with reference to solid state diffusion bonding, but it is equally applicable to use activated diffusion bonding in which metal foil activators are placed between the workpieces, or components, and which melt and immediately solidify to form the diffusion bond at the bonding temperature.

I claim:

1. A method of manufacturing an article by diffusion bonding at least two metalwork pieces, comprising the steps of:
    (a) assembling the at least two metalwork pieces into a stack relative to each other so that the surfaces are in mating contact,
    (b) sealing the edges of the at least two metal workpieces together, except for an aperture where a pipe is to be inserted, joining a pipe to the stack to provide a sealed assembly, the pipe having an inner diameter, a thickness and an end, the inner diameter of the pipe being greater than twice the thickness of the pipe, joining the end of the pipe to the stack such that the axis of the pipe is arranged at an angle of at least 45° to the axis of the aperture and the axis of the end of the pipe at the joint between the end of the pipe and the stack is arranged at an angle of at least 45° to the axis of the aperture such that during the subsequent diffusion bonding step suck back of the pipe into the stack is substantially reduced, (c) evacuating the interior of the sealed assembly via the pipe, (d) sealing the pipe with at least one seal, (e) applying sufficient heat and pressure across the thickness of the at least two metalwork pieces to diffusion bond the at least two metalwork pieces together to form an integral structure.

2. A method as claimed in claim 1 wherein the sealing of the edges of the at least two metal workpieces comprises welding the edges of the at least two metal workpieces together.

3. A method as claimed in any of claim 1 wherein the pipe is joined to the stack such that the axis of the pipe is arranged at an angle of at least 60° to the axis of the aperture.

4. A method as claimed in claim 3 wherein the pipe is joined to the stack such that the axis of the pipe is arranged at an angle of 90° to the axis of the aperture.

5. A method as claimed in claim 1 wherein the pipe has a diameter less than the aperture, the method comprises sealing the aperture to the outer periphery of a ring and sealing the pipe to the inner periphery of the ring.

6. A method as claimed in claim 1 wherein the method comprises before the metal workpieces are stacked together, applying a stop off material to preselected areas of at least one of the surfaces of at least one of the at least two metal workpieces to prevent diffusion bonding at the preselected areas, before the pipe is sealed placing the sealed assembly in an oven, heating the sealed assembly while it is within the oven to evaporate volatile binder from the stop off material and continuously evacuating the sealed assembly to remove volatile binder from between the at least two metal workpieces of the sealed assembly, after the integral structure is formed heating the integral structure and internally pressurising the integral structure to cause some of the preselected areas of at least one of the metal workpieces to be superplastically formed to produce an article of predetermined shape.

7. A method as claimed in claim 6 wherein the article is selected from the group comprising a fan blade, a compressor blade, a fan duct outlet guide vane and a heat exchanger component.

8. A method as claimed in claim 7 wherein each metal component is manufactured by applying stop off material to pre-selected areas of at least one of the surfaces of the at least one of the at least two metal components to prevent diffusion bonding at the preselected areas, assembling the at least two metal components into a stack relative to each other so that the surfaces are in mating contact, sealing the edges of the top at least two metal components together, except for an aperture where a pipe is to be inserted, joining a pipe to the stack to provide a sealed assembly, placing the sealed assembly in an oven, heating the sealed assembly while it is within the oven to evaporate volatile binder from the stop off material and continuously evacuating the sealed assembly to remove volatile binder from between the at least two metal components of the sealed assembly, sealing the pipe with the least one seal, applying sufficient heat and pressure across the thickness of the at least two metal components to diffusion bond the at least two metal components together to form an integral structure, heating and internally pressurising the integral structure to cause some of the pre-selected areas of at least one of the metal components to be superplastically formed to produce a metal component of predetermined shape.

9. A method as claimed in claim 8 wherein the metal components are heat exchanger components and the article is a heat exchanger.

10. A method as claimed in claim 2 wherein the pipe is joined to the stack such that the axis of the pipe is arranged at an angle of at least 60° to the axis of the aperture.

11. A method as claimed in claim 1 wherein the pipe is joined to the stack such that the axis of the pipe is arranged at an angle of at least 60° to the axis of the aperture.

12. A method of manufacturing an article by diffusion bonding at least two metal workpieces having edges, comprising the steps of:

(a) assembling the at least two metal workpieces into a stack relative to each other so that the surfaces are in mating contact, (b) sealing the edges of the at least two metal workpieces together, by placing the at least two metal workpieces in a metal bag, the metal bag having an aperture, joining a pipe to the bag to provide a sealed assembly, with the pipe having an inner diameter and a thickness and with the inner diameter of the pipe being greater than twice the thickness of the pipe and wherein the pipe has an end and the end of the pipe is joined to the bag, and joining the pipe to the bag such that the axis of the pipe is arranged at an angle of at least 45° to the axis of the aperture, and the axis of the end of the pipe at the joint between the end of the pipe and the bag is arranged at an angle of at least 45° to the axis of the aperture such that during the subsequent diffusion bonding step suck back of the pipe into the baa is substantially reduced.

(c) evacuating the interior of the sealed assembly via the pipe, (d) sealing the pipe with at least one seal, (e) applying sufficient heat and pressure across the thickness of the at least two metal workpieces to diffusion bond the at least two metal workpieces together to form an integral structure.

13. A method as claimed in claim 1 wherein the metal components are heat exchanger components and the article is a heat exchanger.

\* \* \* \* \*